Dec. 18, 1923. 1,477,999
L. F. DOUGLASS
METHOD AND APPARATUS FOR PRODUCING NOVEL AND MULTIPLE IMAGE
EFFECTS IN PHOTOGRAPHY
Filed Feb. 20, 1922
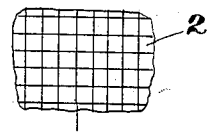
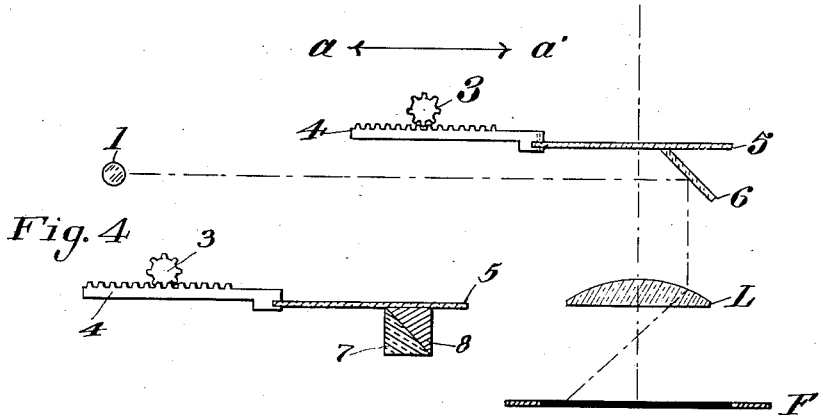
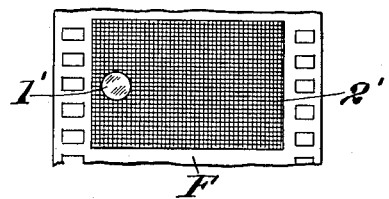
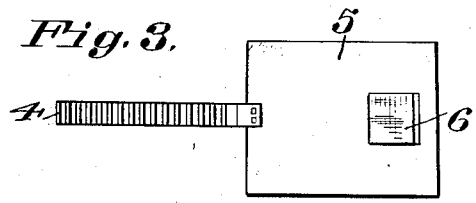
Inventor,
Leon F Douglass
By J.E. Frabucco
attorney Patented Dec. 18, 1923.

1,477,999

UNITED STATES PATENT OFFICE.

LEON F. DOUGLASS, OF MENLO PARK, CALIFORNIA.

METHOD AND APPARATUS FOR PRODUCING NOVEL AND MULTIPLE-IMAGE EFFECTS IN PHOTOGRAPHY.

Application filed February 20, 1922. Serial No. 537,940.

*To all whom it may concern:*

Be it known that I, LEON F. DOUGLASS, a citizen of the United States, residing at Menlo Park, in the county of San Mateo and State of California, have invented new and useful Improvements in the Method and Apparatus for Producing Novel and Multiple-Image Effects in Photography, of which the following is a specification.

This invention relates to the method and apparatus whereby novel or visionary image effects of a single object or scene may be produced simultaneously with images of another separate or distinct object or scene on a single photographic film or plate.

An object of this invention is to provide a novel method and improved apparatus whereby a reduced or small sized image effect of an object may be produced upon a single photographic film or plate, simultaneously with an image of a separate and distinct object.

Another object of my invention is to provide apparatus of the type just characterized which may be readily applied to an ordinary camera without change in its mechanism or construction.

Another object of this invention is to provide a novel method and improved apparatus whereby phantom-like or visionary image effects of an object may be secured upon a single photographic film or plate simultaneously with an image of a separate and distinct object.

Stated broadly, the invention comprises in combination with a sensitized film or plate and a lens for focusing images onto said film, a small light directing element positioned to reflect a small sized image of an object through said lens onto said film, and simultaneously therewith allow an image from another object to proceed past said element, on all sides thereof, through said lens onto said film.

Generally stated, I place in front of a camera lens, and along a plane which lies at an angle of 90 degrees in reference to said lens, a clear glass, to which is attached by means of glue or other suitable adhesives, a small silvered mirror or prism, so positioned thereon that it reflects an image of an object through said lens and onto said film, and at the same time allows an image of another object to proceed through said clear glass and said lens onto said film, thereby producing novel and multiple image effects on said film by a single exposure.

In order to increase the number of novel and multiple image effects that may be secured, I associate with said clear glass a rack and pinion, which by the manipulation thereof moves the said clear glass and the small silvered mirror attached thereto in such a manner that an image reflected by said small silvered mirror is made to move across the surface of said film, while an image from an object immediately in front of said camera lens is permitted to proceed through the clear glass and lens onto said film, thereby producing by a single exposure on said film a miniature or visionary appearing image of one object associated with an image of another object.

In said drawings:

Figure 1 is a diagrammatic view illustrating the two objects to be photographed, one of said objects being shown in part only, the clear glass in a vertical position, a small reflecting mirror attached to the clear glass, the lens and the photographic film;

Figure 2 is a diagrammatic fragment of a photographic film upon which two images are produced, one of said images being of comparatively smaller proportions than the other of said images;

Figure 3 is an elevation view showing the clear glass together with the small silvered mirror attached to the same.

Fig. 4 is a detail sectional view illustrating a prism attached to the clear glass.

Referring more particularly to Fig. 1, object 1 is positioned at an angle of approximately 90 degrees with reference to the axis of the lens L, which may be the lens of an ordinary camera, and object 2 is positioned directly in front of the camera and said lens. Interposed in the path of the light rays emanating from object 1 is a silvered mirror 6, attached by a suitable adhesive or ordinary glue to a glass 5, which is preferably glass of suitable clearness and free from ordinary flaws or imperfections. Mirror 6 is so attached to and positioned on clear glass 5 that it will reflect a portion of the light rays emanating from said object 1, through the lens L and onto the sensitized film or plate F. Directly in front of the camera lens L is object 2, the light rays from which proceed through said clear glass 5 and said lens L onto said film F. Clear glass 5 has attached to it by any suitable means such as screws or rivets, rack 4 which engage with pinion 3. By turning pinion 3 the clear glass 5, together with mirror 6, moves along the horizontal plane indicated by the arrow a—a', in such a manner that the rays of light coming from object 1 are either allowed to be reflected by mirror 6 through the lens L onto said film F, or are not permitted to proceed to said film, as is desired. The rays of light coming from object 2 proceed through the clear glass 5, and through lens L onto film F, where image 2' of said object 2 is produced, the said clear glass mirror not affecting the intensity of said rays to any appreciable degree. Rays of light proceeding from object 1 to mirror 6 are reflected by said mirror through said lens and onto said film F where image 1' of said object is produced in comparatively smaller proportions and within the lateral limits of image 2'. By moving the pinion 3 the clear glass 5 together with mirror 6 may be moved in such a manner that the image of object 1 is not reflected through lens L, or the said mirror may be slowly moved so that the said image gradually appears on film F, or gradually disappears therefrom, as is desired.

When it is desired to produce a miniature image of object 1, the clear glass 5 is placed in the position shown in Fig. 1, and to the surface thereof is affixed by means of glue or any other suitable adhesive, a small novel shaped silvered mirror 6 or other suitable light-directing element, which is positioned so as to reflect an image from object 1 through lens L and onto film F. The light rays proceeding from object 2 proceed through the clear glass 5, except for the part thereof covered by small mirror 6, and through lens L to film F where the image 2' is produced. Simultaneously therewith a portion of the light rays proceeding from object 1 to small mirror 6 are reflected by said mirror through said lens and onto said film where a miniature image 1' of said object 1 is produced. Thus by a single exposure an image of object 1 and an image of object 2 are simultaneously produced on film F. The small mirror 6 may be placed in any position desired on the clear glass 5, its said position thereon controlling the vertical position of the miniature image of object 1 when produced on film F. The lateral position of the image of object 1 on the film F is controlled by the movement of pinion 3, which moves the clear glass 5 together with small mirror 6 in the directions indicated by arrow a—a'.

By means of the apparatus herein shown the image from object 1, by the manipulation of pinion 3 associated with the clear glass 5, may be made to gradually disappear from the film or may be made to gradually appear thereon, as can be readily seen.

I have found that by making small silver mirror 6 of unique shape the outline of the image reflected upon film F will assume the shape of the mirror, and its size will likewise vary according to the size of the mirror so reflecting the image. Therefore by varying the size and shape of mirror 6, numerous novel effects may be produced upon the said film.

It will therefore be perceived that I have provided a method and apparatus for producing novel and multiple image effects upon a single film or plate by a single exposure. The small silvered mirror 6 reflects a miniature image of an object through lens L onto film or plate F, while simultaneously therewith an ordinary image of a separate object is allowed to proceed through said lens onto said films. So on a single film or plate, by a single exposure, an image of an object or a scene is produced which appears as a phantom, a vision or in an unusual size, together with an image of a separate object or scene.

In carrying out my invention it is not necessary that a mirror be used in producing a miniature image of object 1, as I have found that a small light reflecting prism will serve the same purpose as does the small mirror 6. As shown in Fig. 4, a prism 7, secured in any suitable manner, as by glue or other adhesive, to a metal support 8, the support being secured to clear glass 5, may be used if desired.

Although I have illustrated and explained my invention as referring to the photographing of objects, it is to be expressly understood that separate scenes or combinations of objects may be photographed in the same manner and with the same apparatus as are the separate objects photographed. Therefore the term "object" as herein employed is to be construed generally as referring to scenes and combinations of objects as well as to individual objects.

While the embodiments of the invention illustrated on the drawings have been described with particularity, it is to be expressly understood that I am not limited to any particular detail of construction, as changes may be made in the means for manipulating the light-reflecting elements, without departing from the spirit of this invention. Nor am I limited to any particular kind or form of photography or cinematography. Nor am I limited to the use of any particular character of sensitized element from which the negative is to be formed, and the term "film" as employed in the claims is to be construed as generic to plates or other suitable sensitized elements. Reference is therefore to be had to the claims hereto appended for a definition of the limits of the invention.

What I claim is:

1. A device of the class described, comprising, in combination with the object lens of a camera, transparent means positioned in a plane transverse to the principal axis of said lens, and a light-directing member secured to said means for directing a small sized image of an object through said lens onto a sensitized film.

2. A device of the class described, comprising, in combination with the object lens of a camera, transparent means positioned in a plane transverse to the principal axis of said lens, a light-directing member secured to said means for directing an image of an object through said lens onto a sensitized film, and means for reciprocating said first-named means in a plane substantially at right angles to said axis.

3. The method of producing composite image effects upon a sensitized photographic film, which comprises positioning a relatively small light-directing member in the field of an object lens of a camera, directing an image of an object with said member through said lens onto a sensitized film, and simultaneously allowing light rays from a second object to proceed on all sides of said member, past the same, and through said lens onto said film.

4. The method of producing composite image effects upon a sensitized photographic film, which comprises allowing light rays from an object to proceed directly to and through the object lens of a camera onto said film, positioning a light-directing element in the field of said lens in such a manner as to obstruct an inner portion of the rays of light proceeding from said object, and directing an image of a second object with said element through said lens onto said film.

5. In motion picture photography the method of producing variable compound image effects on a sensitized film which comprises allowing rays of light from an object to proceed directly to and through an object lens of a camera onto said film, intercepting an inner portion of said rays of light with a light-directing member, simultaneously directing an image of a second object with said member through said lens onto said film, and dissolving said small sized image from said film, the latter being moved between successive exposures.

6. The method of producing phantom image effects on a sensitized film which comprises allowing light rays from an object to proceed directly through a transparent member and the object lens of a camera onto said film, positioning a light-directing element on said member so as to intercept a portion of said rays, and simultaneously directing an image of a second object with said element through said lens onto said film.

7. In motion picture photography the method of producing composite image effects on a sensitized film which comprises allowing light rays from an object to proceed directly through a transparent member and the object lens of a camera, obstructing a portion of said rays with a light-directing element secured to said member, simultaneously directing the image of another object with said element through said lens onto said film, and lineally moving said image as a whole relatively to said film, the latter being moved between successive exposures.

8. The method of producing phantom image effects on a sensitized film which comprises allowing light rays from an object to proceed through the object lens of a camera onto said film, obstructing a portion of said rays within the outer limits of the image thus produced on the film, and simultaneously directing light rays from another object, positioned in a plane located at an angle to the principal axis of said lens, onto that portion of said film from which the light rays from said first object have been obstructed.

9. The method of producing composite image effects on a sensitized film which comprises allowing light rays from an object to proceed through an object lens of a camera onto said film, obstructing a portion of said rays within the outer limits of the image thus produced on the film with a light-directing element, and simultaneously directing light rays from another object onto that portion of said film from which the light rays from said first-named object have been obstructed.

10. The method of producing composite image effects on a sensitized film which comprises allowing light rays from an object to proceed through an object lens of a camera onto said film, obstructing a portion of said rays within the outer limits of the image thus produced on the film with a light-directing element, simultaneously directing light rays from another object onto said film, and lineally moving said light-directing element, said film being moved between successive exposures.

11. The method of producing variable image effects on a sensitized film which comprises positioning a transparent member in the field of an object lens of a camera, interposing a light-directing element between said lens and member, allowing light rays from an object to proceed through said member and said lens onto said sensitized film, and simultaneously moving said member and said element to direct light rays from another object through said lens onto said film, the latter being moved between successive exposures.

12. A device of the class described comprising, in combination with an object lens of a camera, a transparent member, and a light-directing element secured to said member.

13. A device of the class described, comprising, in combination with an object lens of a camera, a transparent member, a light-directing element secured to said member, and means for lineally moving said member and element.

14. A device for producing variable image effects comprising, in combination with an object lens of a camera, a transparent member positioned in a plane substantially at right angles to the principal axis of said lens, a light-directing element secured to said member, and means whereby said member may be lineally moved in said plane.

15. A device of the class described comprising, in combination with an object lens of a camera, a transparent member positioned between an object to be photographed and said lens, a light-directing element attached to said member, and means for lineally moving said element and member to a position such that the element may direct light rays from a second object positioned in a plane at an angle to the principal axis of said lens, through said lens onto a sensitized film simultaneously with the passage of light rays from said first-named object through said member and lens onto said film.

16. A device for producing composite images on a sensitized film, comprising, in combination with an object lens of a camera, a lineally movable member positioned in the field of said lens, a light-directing element, having an area less than that of one of said images, secured to said member whereby another image may be directed onto said film within the outer limits of said first-named image.

17. A device for simultaneously producing composite images on a sensitized film comprising, in combination with a lens of a camera, a light-directing element having an area less than one of said images positioned to direct another image onto said film within the outer limits of said first-named image.

18. A device for producing composite images on a sensitized film comprising, in combination with a lens of a camera, a light-reflecting member having an area less than the field of said lens, and means mounting said member whereby light rays from an object may proceed through said lens onto said film simultaneously with the reflection of light rays from a second object by said member through said lens onto said film within the outer limits of the image produced by said first-named rays.

19. Means for producing variable image effects of two objects upon a single sensitized film, in combination with a lens, a clear glass, positioned in front of said lens, through which pass the rays of light from one of said objects to said film, a small light reflecting element attached to said clear glass and positioned to reflect an image of the other of said objects through said lens onto said film, and means attached to said clear glass for moving said clear glass and light reflecting element.

LEON F. DOUGLASS.